United States Patent [19]

Campanella et al.

[11] Patent Number: 4,792,963

[45] Date of Patent: Dec. 20, 1988

[54] SATELLITE CLOCK SYSTEM

[75] Inventors: S. Joseph Campanella; Thomas Inukai, both of Gaithersburg, Md.

[73] Assignee: Communications Satellite Corporation, Washington, D.C.

[21] Appl. No.: 388,005

[22] Filed: Jun. 14, 1982

[51] Int. Cl.[4] .......................... H03K 1/17; H04L 7/00
[52] U.S. Cl. ..................................... 375/109; 455/12; 370/104
[58] Field of Search ................. 375/106, 108, 109, 101, 375/1; 370/104; 343/100 ST; 455/11, 12, 54; 371/34, 35, 40; 364/459; 179/2 DP

[56] References Cited

U.S. PATENT DOCUMENTS

| 3,562,432 | 2/1971 | Gabbard | 370/104 |
|---|---|---|---|
| 3,596,002 | 7/1971 | Ohnsorge | 370/104 |
| 3,995,111 | 11/1976 | Tsuji et al. | 375/115 |
| 4,004,098 | 1/1977 | Shimasaki | 370/104 |
| 4,215,348 | 7/1980 | Cordaro et al. | 370/104 |
| 4,320,503 | 3/1982 | Acampora | 370/104 |
| 4,413,282 | 11/1983 | Wargo | 375/101 |
| 4,435,825 | 3/1984 | Tomooka | 375/81 |

OTHER PUBLICATIONS

Campanella et al "On Board Clock Correction for SS/TDMA and Baseband Processing Satellites" Comsat Tech Rev (USA) vol. 11 No. 1 (Spring 1981) pp. 77-102-77-101.

Primary Examiner—Benedict V. Safourek
Assistant Examiner—Stephen Chin

Attorney, Agent, or Firm—Sughrue, Mion, Zinn, Macpeak, and Seas

[57] ABSTRACT

A satellite clock system in which the frequency of the onboard satellite clock, which is implemented as a relatively high uncertainty voltage-controlled oscillator, is corrected in accordance with a high-stability, low-uncertainty terrestrial clock. Metering bursts are transmitted from the earth station to the satellite where portions of the metering bursts are truncated due to misalignment between the bursts and the synchronization windows timed by the onboard oscillator of the satellite. The patterns of the received bursts which are retransmitted by the satellite are compared with a stored pattern and a phase shift value determined in accordance with the number of incorrect comparisons. The phase error measurement value is utilized to control a programmable divider connected between the high-stability, low-uncertainty oscillator and the burst transmitter to thus provide a short-term correction. The output values from the phase error measurement are accumulated over a sidereal day period to provide a sidereal day phase shift value. The accumulated value of the sidereal day phase shifts is summed with all previous daily values to compute a cumulative phase shift from the beginning of the system operation. The current and cumulative phase shift values are then summed and divided by a period of one sidereal day to produce an actual phase correction for the next sidereal day. The actual daily frequency correction is computed by summing all values of the sidereal day frequency correction and telemetering this value to the satellite. Alternately, the accumulation of the frequency corrections can be performed onboard the satellite.

14 Claims, 3 Drawing Sheets

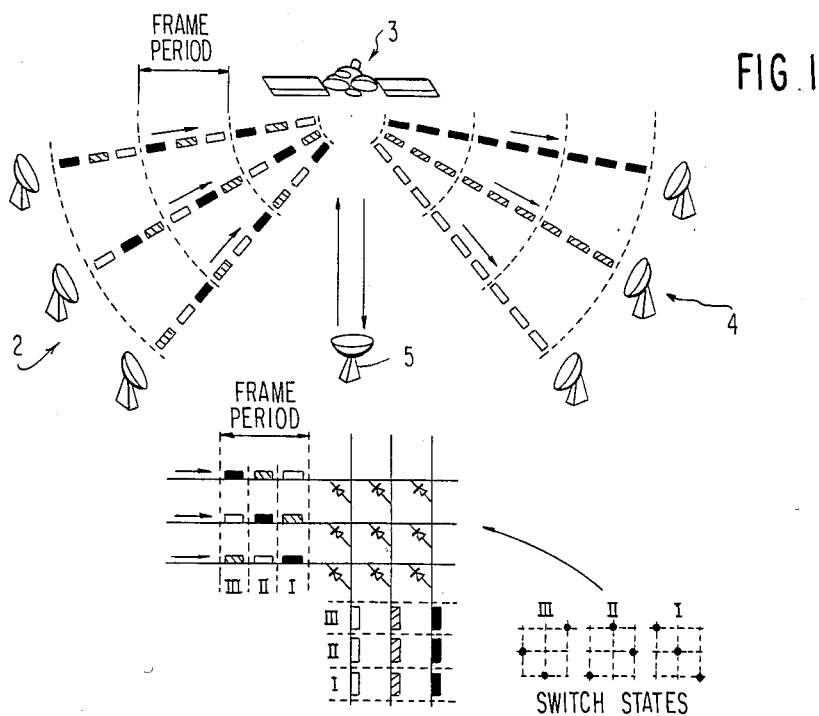
FIG. 1
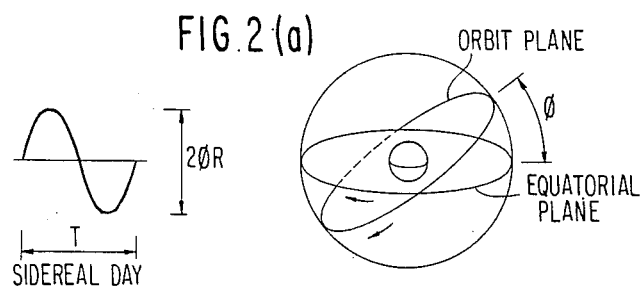
FIG. 2(a)
FIG. 2(b)
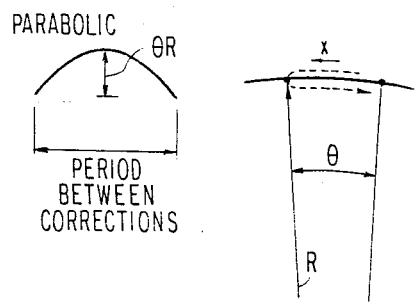
FIG. 2(c)
$$\varepsilon = \frac{\sqrt{a^2 - b^2}}{a} = \sqrt{\frac{2(a-b)}{a}}$$

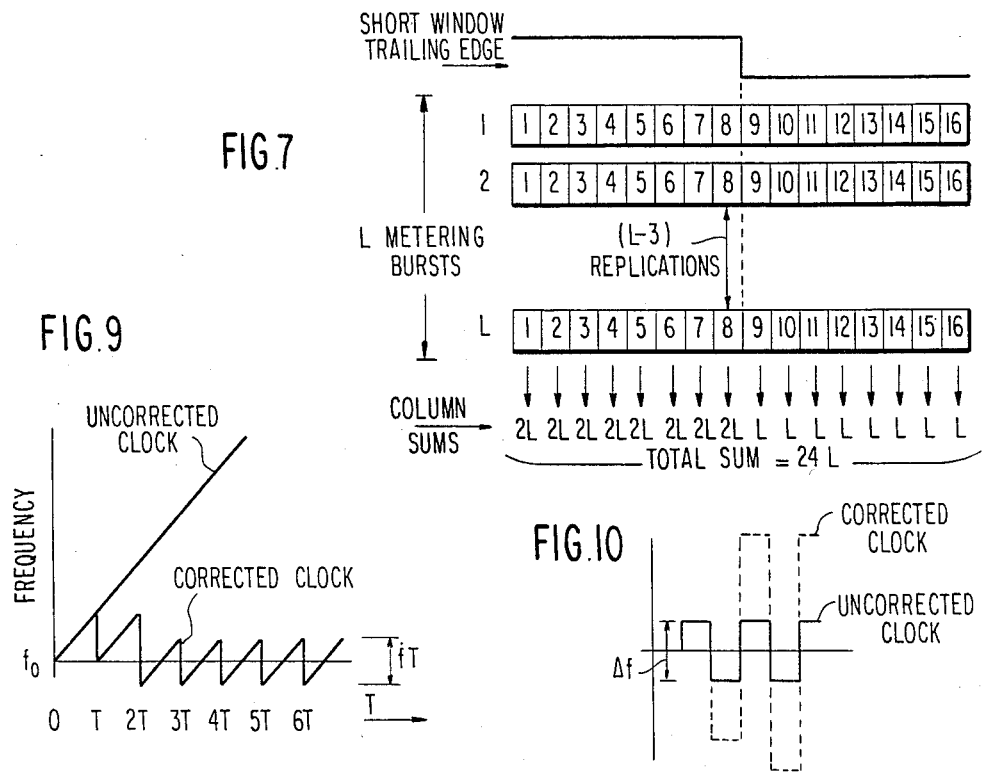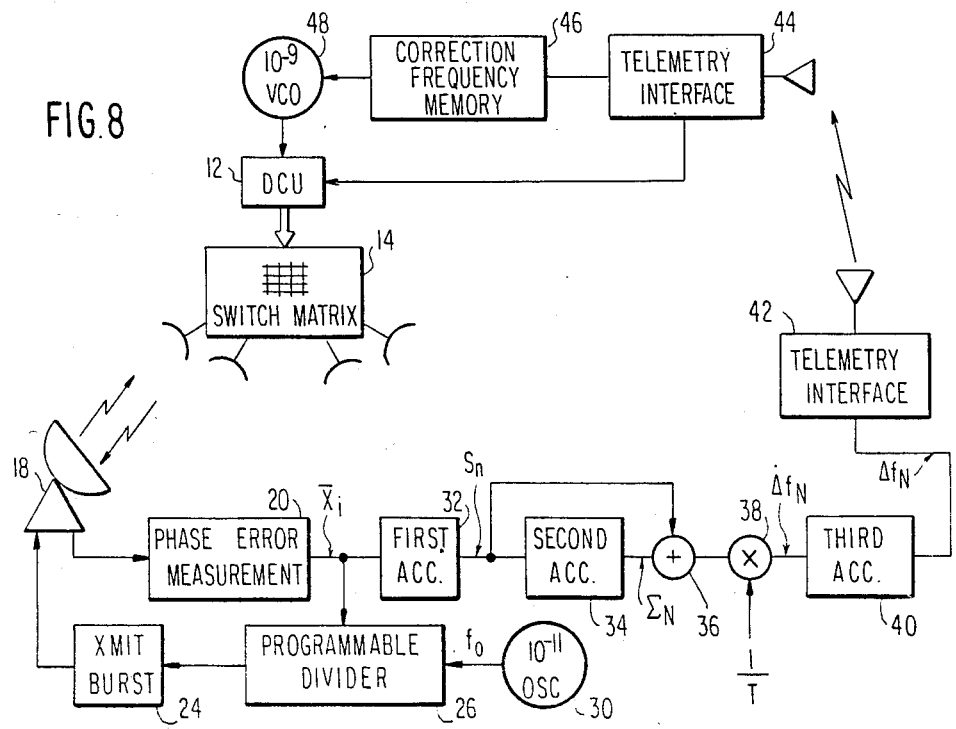

SATELLITE CLOCK SYSTEM

BACKGROUND OF THE INVENTION

The invention relates to a clock system for use in a satellite comunications system. More particularly, the invention relates to such a clock system having an improved stability and reduced clock uncertainty.

SS-TDMA (satellite-switched time division multiple access) is being seriously considered for use in future international satellite systems. Such systems may use TDMA as a principal means for carrying communications information. Also, the use of multiple beams to achieve extensive frequency reuse is expected to become more prevalent.

In such systems, a satellite switch is used to achieve interconnections among the various beams. This allows TDMA traffic bursts transmitted on one beam to the satellite to be routed to any selected receiving location on a designated re-transmission or "down" beam from the satellite as required by a system traffic plan. The beam interconnections used in the switch are programmable and can be changed to optimize traffic flow.

FIG. 1 is a simplified represenatation of an SS-TDMA system with three transmitting stations 2 on the left and three receiving stations 4 on the right. (The transmitting and receiving stations are shown separately; however, they are actually colocated in pairs.) Data transmission occurs in TDMA frame periods with each transmitting station being assigned an "epoch" in the frame during which it can transmit traffic bursts designated for a particular downbeam. Although only one station is shown in each uplink or downlink beam, it should be appreciated that several stations may be located in the same beam and each assigned epochs for transmission in a known manner. Such a satellite switch, shown schematically at the bottom of FIG. 1, routes the traffic bursts to the appropriate down-beams in accordance with a switch state program stored on board the satellite in a memory. In the example illustrated in FIG. 1 three stored switch states, designated I, II, and III, are sequentially used by the switch matrix at the appropriate times during the TDMA frame to achieve the necessary routing. These satellite switch states occur in a frame period which is synchronized to the TDMA frame period. Control of the switch states and the frame period are administered by a satellite switch control earth station 5. In actual operation, many more switch states may be used and a station may be required to transmit a burst more than once per TDMA frame period. Also, the duration of switch states will not necessarily be equal.

In the SS-TDMA system, timing of traffic station burst transmission and reception is governed by the period of the SS-TDMA switch frame. Proper synchronization must be achieved between the SS TDMA switch frame period and the timing of digital transmissions in the terrestrial system which it serves. Otherwise, serious loss of information will occur. Hence, any difference between the requirement to synchronize to the SS-TDMA frame period and the synchronization requirements at the terrestrial system interface must be reconciled.

It has been proposed that international interfaces between digital networks be interconnected by digital buffers designed to permit a time displacement of one primary multiplex frame, for example 125 $\mu$s, before a frame slip occurs to permit realignment of the digital transmission signals. It has further proposed that the clock signals governing the timing of each network be controlled to an uncertaintly of $\pm 10^{-11}$. This leads to a primary multiplex frame slip of once every 72.34 days at a terrestrial digital interface. This is referred to as plesiochronous operation. If digital satellite links are to be compatible, the digital satellite system must operate within the constraints established for plesiochronous operation.

Thus, for successful operation in an SS-TDMA system, the SS-TDMA clock on board the satellite must exhibit a stability such that the resultant uncertainty does not cause a primary multiplex frame slip more than once every 72.34 days. This means that the uncertainty averaged over 72.34 days must be no greater than $\pm 10^{-11}$. Also, other short-term variations such as those due to satellite motion or the control mechanism must be absorbed within the digital satellite system.

A satellite never remains truly stationary; instead it moves about in a "box" centered at its nominal location. For example, for the satellite known as INTELSAT V, this box is defined by maximum variations of $\pm 0.1$ degrees in the east-west direction for long-term positional drift between position keeping maneuvers, $\pm 0.5$ degrees in the inclination of the orbital plane relative to the equatorial plane, and an orbital eccentricity of $\epsilon = 5 \times 10^4$. The inclination of the orbit may become as small as $\pm 0.1°$ in tightly controlled satellites. These variational components are illustrated in FIGS. 2(a)-2(d). For the radius of the stationary orbit (41,600 km), the peak-to-peak long term east-west positional variation is 146 km, which occurs over a period of approximately 30 days between position keeping exercises. The maximum peak-to-peak north-south positional variation due to orbital inclinations is 728 km and is a sinusoidal function with a sidereal day period (86,160 sec.). Two components with sidereal day periodicity due to orbital eccentricity occur. An altitude variation (given by $\pm R\epsilon$) is 42 km, and an east-to-west variation (given by $\pm 2R\epsilon$) is 84 km.

These variations dictate the size of buffers at earth station terminals needed to absorb path length changes. If the SS-TDMA frame period were established on board by a perfectly stable clock, the buffer at an earth station must only be large enough to absorb the path length change between the station and the satellite. Buffer size is usually expressed in terms of the propagation time of the radio frequency signal over the distance variation involved. The distance variation experienced by an earth station is composed of the projection of satellite position variation on the line of sight to the station. All variations given in the following discussion are peak-to-peak. For a station at the sub satellite point, only the altitude variation is seen; hence, the buffer must be large enough to accommodate a sidereal day period distance variation of 42 km or a time variation of 140 $\mu$s. For a station located at the horizon on the equator, the altitude variation is reduced to 138 $\mu$s, but a long-term east-west variational component of 74 $\mu$s and a sidereal day east-west component of 42.5 $\mu$s appear. In this case, the north-south variation is negligible.

For a station located at the horizon in a plane including the axis of the earth's rotation and the satellite, the north-south component is maximum and results in a sidereal day period variation of 375 $\mu$s and an altitude sidereal day period variation of 138 $\mu$s. If the two components are in-phase, the peak-to-peak sidereal day variation becomes 513 μs. If the orbital plane inclination angle variation is reduced to ±0.1 degrees, the latter north-south contribution is reduced to 74 μs and the combination of both components becomes 212 μs. The maximum variation does not occur for this case, but in a plane 81 degrees relative to the one defined above, the maximum variation is 520 μs for a ±0.5 degrees orbital plane. If the orbital plane variation is reduced to ±0.1 degrees, the maximum variation occurs for a station at the horizon in a plane 45 degrees. In this case, the maximum variation is 244 μs.

Buffers at the earth terminals provided to accommodate the variations given above will eliminate the consequences of satellite motion from the clock stability problem. Then, the only remaining consideration is the uncertainty in the onboard clock. The onboard clock uncertainty will effectively be transferred to all satellite system terrestrial interfaces. Thus, the onboard satellite clock is literally a worldwide timing reference.

Due to the weight and size restrictions, typically a satellite-born clock will have an uncertainty of no better than $\pm 10^{-9}$ per day. This is unacceptable for future proposed satellite communication systems. Since provision of an isolated reference clock on board the satellite with the desired small uncertainty is not economically conceivable with present technology as an atomic clock must be used to achieve the desired uncertainty, an alternate means of achieving the necessary level of uncertainty must be provided.

The onboard components of a previously proposed SS-TDMA switch as shown in FIG. 3 include a dynamic microwave switch matrix 14, a distribution control unit 12, and a timing unit or clock 10. The distribution control unit is programmed to provide a cyclic sequence of connections to the switch matrix 14 to execute desired beam interconnections. The timing of the cyclic sequence within the switch matrix 14 is controlled by the onboard clock 10.

The switch sequence may be considered to consist of individual stationary connection patterns called switch states. FIGS. 4(a) and 4(b) illustrate two ways of depicting switch states. FIG. 4(a) shows in crossbar matrix notation connections from various up-beams to down-beams indicated by dots at row-column intersections, and FIG. 4(b) shows in columnar notation connections from various up-beams identified in the terms of the down-beams to which connections are made.

Cascaded switch states form a switch state sequence such as the one shown in FIG. 5 which uses columnar notation. The switch state sequence is repeated at the SS-TDMA frame rate. Each frame is divided into a synchronization field, used for acquisition and synchronization of the satellite switch and for distribution of the TDMA reference bursts, and a traffic field, which provides the up-beam to down-beam connections needed to carry the traffic. This arrangement is shown on a 6×6 beam system as an example. FIG. 5 also shows a typical structure for the synchronization field. State I consists of a short state that provides loopback connections to the congruent beam to accomplish acquisition and synchronization by means of an acquisition and synchronization unit. This is called the synchronization window. State II is a short open connection state needed to terminate State I loopback connections, and State III is a reference burst distribution state. Other switch states comprise the traffic field. The following discussion is related to State I, which provides the loopback synchronization window connection for acquisition and synchronization of the satellite switch frame.

A block diagram of a known acquisition and synchronization unit 19 is shown in the lower portion of FIG. 3. It is located at one of the earth stations shown in FIG. 1 which is called a reference station. In this unit, a phase error measurement circuit 20 receivess signals picked up and amplified by an antenna-receiver 18. The operation of the phase error measurement circuit 20 will be explained in detail below. The digital output from the phase error measurement circuit 20 is fed to the control input of a programmable divider 26 and to the data input of an accumulator 22. The accumulator 22 is clocked periodically, e.g., once each sidereal day, to compensate for Doppler shift and voltage-controlled-oscillator (VCO) drift. The output of the accumulator 22 is fed to the control input of a voltage-controlled oscillator 28, the output of which is coupled to the clock input of the programmable divider 26.

The output pulses produced by the programmable divider 26 trigger a burst transmitter 24 which emits test or metering bursts which are transmitted to the satellite. The metering burst, which is fixed in format and which will be explained in further detail below, is used to carry out a measurement of the difference in time alignment between the bursts transmitted by the earth station and the synchronization windows set by the satellite.

The acquisition and synchronization unit 19 establishes and maintains synchronization between TDMA reference station bursts and the SS-TDMA frame, the timing of which is determined by the onboard clock. It has two modes of operation, acquisition and synchronization. In the acquisition mode, a special low-power, two-tone FSK-modulated burst is transmitted to locate the synchronization window with coarse accuracy. In the synchronization mode, a special metering burst is transmitted which permits accurate metering of the difference between the burst location and the trailing edge of the synchronization window. FIG. 6 illustrates the relationship of the metering burst to the trailing edge of the synchronization window.

The control function of the acquisition and synchronization unit 19 is organized so that the center of the metering burst is maintained at the trailing edge transition of the synchronization window. FIG. 7 illustrates the method of accomplishing the measurement. It is assumed that each metering segment contains 16 QPSK symbols and that each symbol carries two information bits. A stored bit pattern is used to generate the metering segment. A metering burst is transmitted and returned to the same controlling earth terminal. When the burst is returned after passage through the satellite switch, the received pattern is compared with the stored pattern and the number of correctly received bits counted. if the burst has been truncated precisely at midpoint, the first eight symbols will contribute 16 correct counts, while the last eight (which have been eliminated) will have states determined by random occurrence, and therefore will contribute an average of only eight correct counts. Thus, when an average of 24 correct counts are received for each metering segment, the center of the metering burst is centered on the trailing edge of the synchronization window. The trailing edge intersection may also be determined by the bit count transition of adjacent symbol positions.

Because a large number of samples are needed to acheive sufficient accuracy, a set of L metering bursts is used in the averaging process. Typically, L will be 32 or 64. When all factors involved are accounted for, including channel error rate, turn-off transitions, and statistical variance due to sample size, the accuracy of the method is ±1 symbol period for a 120-Mbit/s TDMA transmission rate.

The operation of the acquisition and synchronization unit shown in FIG. 3 will now be described. It is assumed that acquisition has taken place and that the acquisition and synchronization unit is maintaining the location of the metering segment of its burst transmission. Each TDMA frame, a burst is transmitted using timing derived from the local clock of the acquisition and synchronization unit using a programmable divider. Using the most recent set of L metering bursts, the phase error measuring circuit measures the displacement between the metering burst center and the synchronization processing. The result of this measurement, which is designated $x_i$, is supplied to both the programmable divider 26 and to an accumulator 22.

The programmable divider 26 immediately makes a displacement correction in the amount $x_i$ to realign its burst transmission in an attempt to reduce the displacement error to zero. Values of $x_i$ can be updated with a period no less than the round-trip propagation time to the satellite plus the duration of the sample smoothing interval.

The value of $x_i$ is also accumulated by the accumulator 22 over an interval of N observations of $x_i$ and used to generate long-term rate corrections for the voltage-controlled oscillator 28. The value of N is selected so that clock corrections occur at, for example, 20 second intervals. This action causes the local voltage-controlled oscillator 28 to track the onboard oscillator drift as well as the frequency variation due to Doppler effects. Thus, the acquisition and synchronization unit generates burst transmission timing at the earth station which aligns the arrival times of the metering burst center at the satellite precisely at the trailing edge of the synchronization window. This timing is also available to generate the reference bursts needed to control the TDMA network.

The acquisition and synchronization unit operation discussed thus far provides only a means of tracking the onboard oscillator of the satellite. Hence, onboard oscillator uncertainty is transferred to the entire TDMA network. This would be sufficient for plesiochronous operation only if the onboard oscillator inherently possessed the required $\pm 10^{-11}$ uncertainty which, as explained above, is not presently technically feasible.

Accordingly, it is an object of the present invention to provide a satellite clock system in which it is not necessary to provide an onboard clock in a satellite having an extremely small uncertainty and in which the overall system uncertainty is considerably better than that of the onboard clock of the satellite.

SUMMARY OF THE INVENTION

In accordance with this, and other objects of the invention, there is provided a satellite clock system in which the satellite clock is implemented as a voltage-controlled oscillator having a relatively high uncertainty. Digital values are telemetered to the satellite to set and correct the frequency of the voltage-controlled oscillator so that the overall uncertainty of the output pulses of the onboard oscillator in the satellite over long periods of time is greatly improved.

To compute the values which are telemetered to the satellite, a metering burst is transmitted from an earth station to the satellite. The metering burst is timed with a high-stability reference oscillator located on the ground. The metering burst contains a predetermined pattern of symbols, such as pseudonoise sequence symbol. The symbol pattern may be incorrectly truncated at the satellite due to misalignment between the burst and the synchronization windows timed by the onboard oscillator in the satellite. The metering burst is returned to the same earth station from which it was transmitted and the symbol pattern of the received burst is compared with the stored pattern. The bits which were truncated due to misalignment between the burst and the synchronization window of the satellite will have a random pattern and hence, on the average, only half of them will correspond to the correct symbols. Thus, by computing an average of the number of incorrect comparisons between a number of received bursts and the stored symbol pattern of the bursts, a value is determined which corresponds to the time amount of misalignment between the metering bursts and synchronization window.

The timing of the metering bursts is accomplished with a very high-stability, low uncertainty oscillator, the output of which is passed through a programmable divider. The output values from the phase error measurement is fed to the control inputs of the programmable divider to provide a short-term correction.

The output value from the phase error measurement are also accumulated over a sidereal day period to provide a sidereal day phase shift value. At the end of each sidereal day, the current value of sidereal day phase shift is summed with all previous daily values of the sidereal day phase shift to thus compute a cumulative phase shift from the beginning of the satellite system operation to the current day. The current sidereal day phase shift and the cumulative phase shift are then summed to produce a predicted phase correction value which will be in effect over the next sidereal day. The actual phase correction for the next sidereal day is produced by dividing the sum of the current sidereal day phase shift and the cumulative phase shift by a value representative of the length of a sidereal day. To compute the actual daily frequency correction, all values of the sidereal day frequency correction are summed, and this cumulative frequency correction value is telemetered to the satellite. In the satellite, the cumulative frequency correction value is used directly to set the output frequency of a voltage-controlled oscillator. If desired, the accumulation of the frequency correction can be performed onboard the satellite, in which instance the values of the sidereal day frequency correction are telemetered from the ground station to the satellite.

BRIEF DESCRIPTION OF THE DRAWINGS

FIG. 1 is a broad schematic view showing a multiple-station satellite network of a type to which the invention may be applied to advantage;

FIGS. 2(a)–2(c) are a series of diagrams utilized to illustrate the various movement of a satellite during a sidereal day;

FIGS. 6 and 7 are timing diagrams showing the alignment between a metering burst as transmitted by an earth station and a synchronization window, the timing of which is set by the onboard oscillator in the satellite;

FIG. 8 is a block diagram showing a satellite and an acquisition and synchronization unit constructed in accordance with the present invention; and FIGS. 9 and 10 are graphical illustrations of frequency deviations of an onboard clock oscillator both with and without the use of the invention.

DESCRIPTION OF THE PREFERRED EMBODIMENTS

Figure 3:
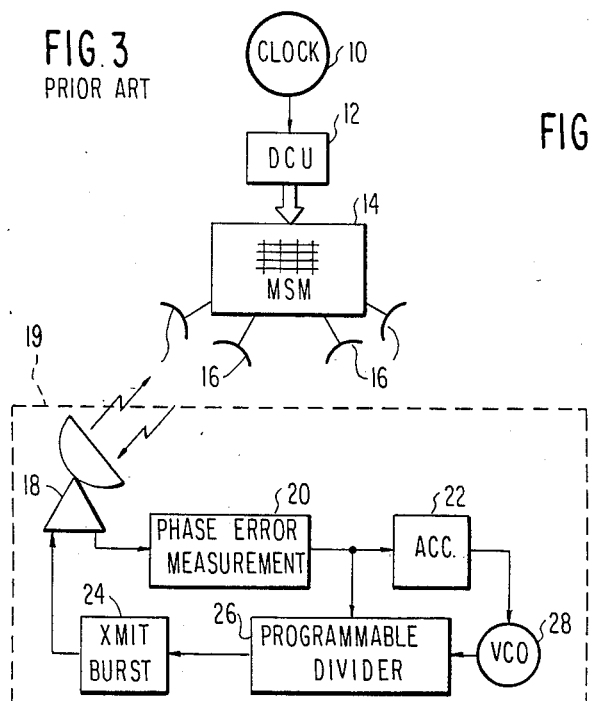
FIG. 3 is a block diagram of a satellite and acquisition and synchronization unit of the prior art.
Figure 4A:
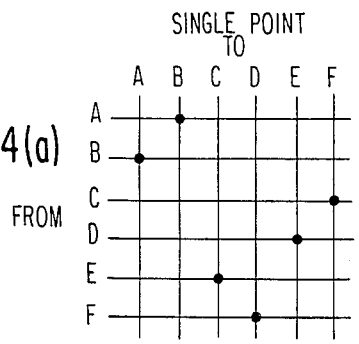
FIG. 4(a) and 4(b) are diagrams showing switch state notations corresponding to switching states of a switching matrix in a satellite.
Figure 4B:
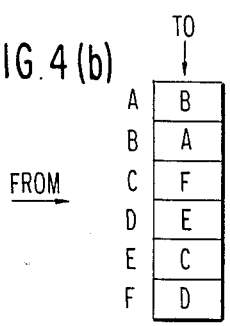
Figure 5:
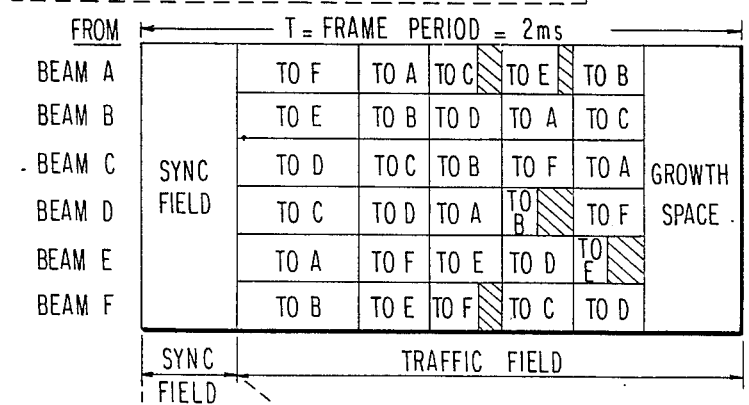
FIG. 5 is a diagram of a satellite-switched time-division multiple access frame format showing various switching states.
Figure 6:
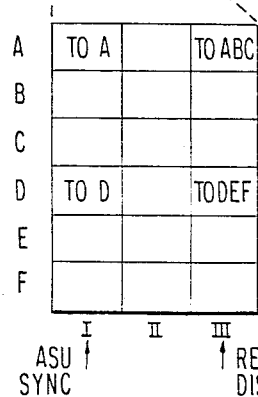
Figure 6:
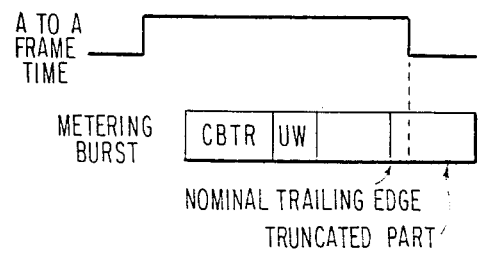

Referring now to FIG. 8, there is shown therein a block-schematic diagram of a satellite and acquisition and synchronization unit constructed in accordance with the teachings of the invention.

In this embodiment, a relatively high uncertainty voltage-controlled oscillator is utilized as the onboard clock for the satellite. The output frequency of the voltage-controlled oscillator 48 is set by the output of a correction frequency memory 46. The value stored in the correction frequency memory 46 is transmitted from the earth station through the telemetry interface 44.

The acquisition and synchronization unit in the earth station includes a phase error measurement circuit 20, a programmable divider 26 and a burst transmitter 24, as in the previously-known system. However, here the oscillator used by the acquisition and synchronization unit in the ground station is a high-stability, low uncertainty clock oscillator, which may, for example, be a cesium clock. Preferably, this oscillator has an uncertainty of $\pm 10^{-11}$ or better.

Further in accordance with the invention, the output incremental frame correction values outputted by the phase error measurement circuit 20 are inputted to a first accumulator 32. The first accumulator 32 is clocked once each sidereal day. The output of the first accumulator 32 is fed directly to one input of a digital adder 36 and through a second accumulator 34, which is also clocked at an interval of one sidereal day, to the other input of the digital adder 36. The output of the digital adder 36 is fed to one input of a multiplier 38, the other input of which receives a fixed value of 1/T preferably, where T corresponds to the period of one sidereal day. The output of the multiplier 38 is fed to the input of a third accumulator 40. The output of the third accumulator 40, which corresponds to a cumulative frequency correction from the start of the satellite operation to the present day, is sent through telemetry interface 42 to the telemetry interface 44 of the satellite and thence to the correction frequency memory 46.

The detailed operation of the system shown in FIG. 8 will now be described.

As mentioned above, the metering bursts transmitted by the burst transmitter 24 are timed with pulses produced by the programmable divider 26, which is clocked by high-stability pulses from the oscillator 30. As in the case of the prior art, the bursts re-transmitted by the satellite are truncated by the trailing edge of the satellite switch synchronization window.

The truncated metering burst is transmitted back to the acquisition and synchronization unit and analyzed in the phase-metering circuit, as in the prior art arrangement. An output $x_i$ is produced, which is the average positional displacement between the center of the metering segment and the trailing edge of the loopback switch state control signal. The value $x_i$ is used by a programmable divider to correct the observed displacement, again as in the previously known arrangement. The minimum interval between corrections is the sum of the round-trip propagation time and the duration of the smoothing interval.

In accordance with the invention, the values of $x_i$ are accumulated over each sidereal day by a first accumulator 32, after which the value of the $S_n$ is read out. During a sidereal day, the satellite completes its diurnal orbital oscillation, which cancels the diurnal periodic contribution in the value of $S_n$. Thus, any north-south or altitude variations which have a sidereal day period are eliminated. As a consequence, $S_n$ represents only the onboard clock drift and the east-west satellite position drift. If the east-west drift were zero, the value of the $S_n$ would represent the total sidereal day phase shift (in TDMA symbols) between the onboard clock and the ground-based reference oscillator.

Each sidereal day, the current value of $S_n$ is summed with all previous values since start-up of operations by a second accumulator 34 to form an output $\Sigma_N$. This output represents the cumulative phase shift from the beginning of operations between the onboard clock (voltage-controlled oscillator 48) and the ground-based reference oscillator 30. If the east-west drift were zero and the rate of drift of the onboard clock were constant, at the end of a sidereal day the value $S_n$ would be zero and $\Sigma_N$ would represent the correction needed to compensate for the next day's drift. In practice, changes in the satellite clock drift characteristics and the rate of east-west drift cause the value of the $S_n$ to be non-zero. Hence, $\Sigma_N$ will vary as the control loop attempts to maintain a zero daily average between the apparent onboard clock frequency and the ground-based reference oscillator. (The apparent onboard clock frequency differs from the true frequency because changes in range due to east-west drift are interpreted by the phase-measuring circuit as a change in frequency.)

To obtain the phase correction which will be in effect over the next sidereal day, the value $S_n$ is added to $\Sigma_N$ by a digital adder 36. This is done in the anticipation that the same value of $S_n$ will also occur the next day. This operation constitutes prediction. As a result, the frequency of the corrected onboard clock approaches a zero daily mean relative to the high-accuracy ground-based oscillator. Finally, the phase correction $\Sigma_N + S_n$ is converted to a frequency correction, $\Delta f_N$ by dividing by the duration of a sidereal day (in TDMA symbols) with a digital multiplier having a fixed value of 1/T inputted at one input thereof.

The daily frequency correction $\overset{\circ}{\Delta f_N}$ is summed by a third accumulator 40 with all preceding values of $\overset{\circ}{\Delta f_N}$ to form the current frequency offset $\Delta f_N$ between the uncorrected onboard clock frequency and the high-accuracy reference oscillator. This final accumulator 40 can be on the satellite or on the ground. Depending on its location either $\overset{\circ}{\Delta f_N}$ or $\Delta f_N$ is telemetered through telemetry interfaces 42 and 44 to the satellite once per sidereal day. To preserve near-zero daily average error characteristics, the correction should be transmitted to the satellite as soon as possible after computation.

FIG. 9 illustrates the operation of the unit of FIG. 8 assuming a continuous ramp clock drift function and zero east-west drift. Note that in the absence of control, the onboard clock frequency would depart from the reference $f_o$ at a rate f. The corrected onboard clock executes a peak-to-peak sawtooth variation of magnitude fT centered about a mean $f_o$, where T is the interval between corrections. Over the long term, subsequent to a start-up transient, the average deviation about the mean $f_o$ is zero.

The worst-case error occurs when the onboard clock executes a step oscillation between $\pm\Delta f/2$ from day to day, as illustrated in FIG. 10. This will result in a maximum offset bound by an interval of $\pm 2\Delta f$. This variation can be absorbed in terrestrial plesiochronous interface buffers by augmenting their size by an amount sufficient to accommodate the resulting phase shift over a sidereal day period T. The amount of needed augmentation is given by:

$$\Delta \tau = \frac{4 \Delta f}{f_o} T$$

If $\Delta f/f_o = 10^{-9}$ and T=86,160 sec., $\Delta\tau$=0.345 ms.

This completes the description of the preferred embodiments of the invention. Although preferred embodiments have been described, it is believed evident to one of ordinary skill in the art that numerous modifications and alterations thereto can be made without deploying from the spirit and scope of the invention.

What is claimed is:

1. A satellite clock system, comprising:
   means for transmitting metering bursts to a satellite;
   means responsive to re-transmitted bursts received from said satellite for determining an amount of error in an onboard clock of said satellite which occurs over a first interval of time which is a sidereal day multiple; and
   means for transmitting to said satellite a value for correcting said error in said onboard clock.

2. A satellite clock system as defined in claim 1, wherein said means for determining comprises error measurement means for generating error signals representing the amount of said error over second time intervals less than said first time interval, and first accumulating means for receiving and accumulating, over a sidereal day interval, output signals from said error measurement means.

3. A method for correcting error in an onboard satellite clock, comprising the steps of:
   transmitting metering bursts from an earth station to a satellite;
   determining, in accordance with re-transmitted bursts received from said satellite, an amount of error in an onboard clock of said satellite which occurs over a first time interval which is a sidereal day multiple; and
   transmitting to said satellite a correction value for correcting said error in said onboard clock.

4. A method as defined in claim 3, wherein said determining step comprises the steps of measuring the amount of error which occurs over second time intervals less than a sidereal day, and accumulating the measured errors over an interval of one sidereal day.

5. A satellite clock system comprising:
   a high-stability, low-uncertainty reference oscillator;
   a programmable divider receiving a clock input from said oscillator;
   means for transmitting metering bursts to a satellite in response to an output signal from said programmable divider;
   means for measuring an amount of phase error in received metering bursts re-transmitted from said satellite, an output signal from said phase error measuring means being coupled to a control input port of said programmable divider;
   a first accumulator receiving an input said output signal from said phase error measuring means;
   a second accumulator receiving an input from an output of said first accumulator;
   an adder receiving inputs from outputs of said first accumulator and said second accumulator;
   means for multiplying an output of said adder by a fixed value;
   a third accumulator receiving an input from an output of said multiplier; and
   means for telemetering an output of said third accumulator to a satellite, said output of said third accumulator being utilized by said satellite as an input control value of a voltage-controlled oscillator onboard reference clock.

6. The satellite clock system of claim 5 wherein said second and third accumulators are clocked once each sidereal day and wherein said value is transmitted to said satellite once each sidereal day.

7. The satellite clock system of claims 5 or 6 wherein said value by which said output of said adder is multiplied is representative of 1/T, wherein T is a sidereal day.

8. The satellite clock system of claim 6 wherein said metering bursts each comprise a plurality of symbols having a predetermined pattern, and wherein said phase error measuring means comprises means for comparing symbols of said received metering bursts re-transmitted from said satellite with said predetermined pattern and means for providing as said output from said phase error measuring means a digital value determined in accordance with a number of incorrect comparisons.

9. A satellite clock system comprising:
   a high-stability, low-uncertainty reference oscillator;
   a programmable divider receiving a clock input from said oscillator;
   means for transmitting metering bursts to a satellite in response to an output signal from said programmable divider;
   means for measuring an amount of phase error in received metering bursts re-transmitted from said satellite, an output signal from said phase error measuring means being coupled to a control input port of said programmable divider;
   a first accumulator receiving as an input said output signal from said phase error measuring means;
   a second accumulator receiving an input from an output of said first accumulator;
   an adder receiving inputs from outputs of said first accumulator and said second accumulator;
   means for multiplying an output of said adder by a fixed value;
   means for telemetering an output of said second accumulator to a satellite, said output of said second accumulator being accumulated on a sidereal day basis and utilized by said satellite as an input control value of a voltage-controlled oscillator onboard reference clock.

10. The satellite clock system of claim 9 wherein each of said second accumulator is clocked once each sidereal day and wherein said value is transmitted to said satellite once each sidereal day.

11. The satellite clock system of claims 9 or 10 wherein said value by which said output of said adder is multiplied is representative of 1/T, wherein T is a sidereal day.

12. The satellite clock system of claim 10 wherein said metering bursts each comprise a plurality of symbols having a predetermined pattern, and wherein said phase error measuring means comprises means for comparing symbols of said received metering bursts re-transmitted from said satellite with said predetermined pattern and means for providing as said output from said phase error measuring means a digital value determined in accordance with a number of incorrect comparisons.

13. A method for correcting error of an onboard satellite clock, comprising the steps of:

transmitting metering bursts from an earth station to a satellite, said metering bursts being timed with pulses produced by a high stability, low-uncertainty reference oscillator divided in frequency by a programmable divider, each said metering burst containing a predetermined pattern of symbols;

comparing the pattern of symbols in received bursts re-transmitted from said satellite with a stored pattern of said predetermined symbols;

computing an average number of incorrect comparisons between received bursts re-transmitted from said satellite and said stored pattern to determine a value corresponding to a time amount of misalignment between transmitted metering bursts and a synchronization window of said satellite, said value being applied to a control input port of said programmable divider;

accumulating values corresponding to the time amount of misalignment between said metering bursts and said synchronization window over a predetermined period of time to determine a current accumulated phase shift value;

accumulating current values of said phase shift value from the beginning of system operation to the current time to provide a cumulative phase shift value;

summing said current phase shift value and said cumulative phase shift value to provide a predicted phase correction;

dividing the sum of said current phase shift value and said cumulative phase shift value by a value representative of said predetermined period of time;

accumulating output values determined as a result of said division at said predetermined period of time from the beginning of system operation to provide a cumulative frequency correction value; and telemetering said cumulative frequency correction value to said satellite, said cumulative frequency value received in said satellite being used to set an output frequency of a voltage-controlled oscillator in said satellite which forms an onboard clock of said satellite.

14. The method of claim 13 wherein said predetermined period of time is a sidereal day.

* * * * *